F. Wittram,
Anchor.

No. 89,454.  Patented April 27, 1869.

WITNESSES.
John Hollingshead
John S. Hollingshead Jr.

Frederick Wittram,
Inventor.

FREDERICK WITTRAM, SAN FRANCISCO, CALIFORNIA.

Letters Patent No. 89,454, dated April 27, 1869.

IMPROVEMENT IN ANCHORS.

The Schedule referred to in these Letters Patent and making part of the same.

*To all whom it may concern:*

Be it known that I, FREDERICK WITTRAM, of the city and county of San Francisco, in the State of California, have invented certain new and useful Improvements in Anchors; and I hereby declare that the following is a full, clear, and exact description thereof, reference being had to the accompanying drawings, making a part of this specification, in which—

Figure 1:
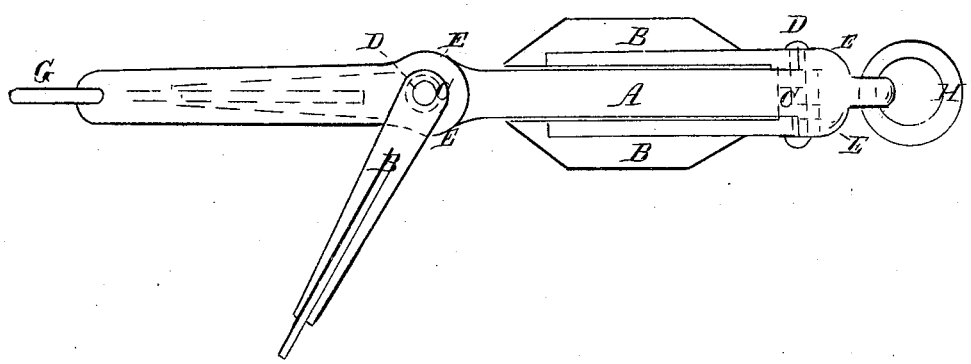
Figure 2:
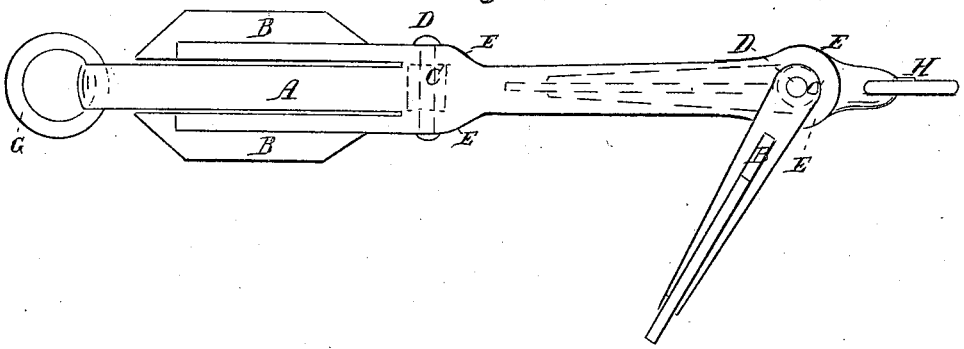

Figure 1 is a view of one side of the anchor;

Figure 2, a view of the adjoining side, at right angles to the first; and

Figure 3:
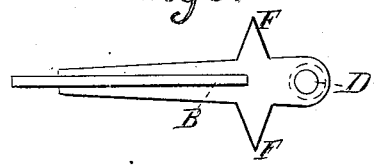

Figure 3 is a modification of one of the flukes or arms.

The letters of reference indicate the same parts in the different figures.

The nature of my invention consists in an improvement upon the anchor patented by me, June 9, 1868, and reissued September 22, 1868; and consists in the substitution of pairs of arms or flukes, working upon the outside of the shank, as hereinafter described, for the single arms shown in said patent.

A is the shank of the anchor, which, in the present instance, carries two pairs of swinging arms or flukes B, each pair being connected by a short shaft, C, passing through the shank A, and working freely therein.

These shafts are placed at, or about at, right angles to each other. For convenience in construction, each of these shafts is divided and halved, or gained together, forming a coupling, which, when bored through its axis and secured by a pin, or bolt, D, forms the pivot or hinge, upon which each pair of flukes swing to a limited extent on each side of the shank, being there stopped by contact with the shoulders E, raised upon the shank.

The modification shown in fig. 3 carries spurs F, which may act as stops against suitable shoulders.

I do not confine myself to the form of flukes shown in the drawing, which lie close to the shank. The shafts C may be longer, or the pair may be made in the form of a U, working in the shank, and limited in its motion in any convenient manner.

This anchor, when in use, is bent to the cable by the ring or shackle G. When it reaches the bottom, gravitation will cause the flukes to project from the under side; one or both pairs will take hold of the bottom, leaving no projections by which the cable can foul in swinging, or upon which a vessel can be injured in shallow water.

When the anchor is weighed, if fished and catted by the ring or shackle H, the flukes will, by gravitation, lie parallel to the shank, presenting no projections which can injure the bows of the vessel. It can be stowed in the chains, or inboard, with great convenience, for the same reason.

What I claim as my invention, and desire to secure by Letters Patent, is—

The combination, with the anchor shank A, of two or more pairs of arms or flukes, pivoted or otherwise secured to the shank, in such a manner that they can be swung in pairs to a limited extent on each side of said shank, in planes perpendicular to or at any other convenient angle to each other, for the purpose specified.

FREDERICK WITTRAM.

Witnesses:
JOHN S. HOLLINGSHEAD,
JOHN S. HOLLINGSHEAD, Jr.